Figure 1:
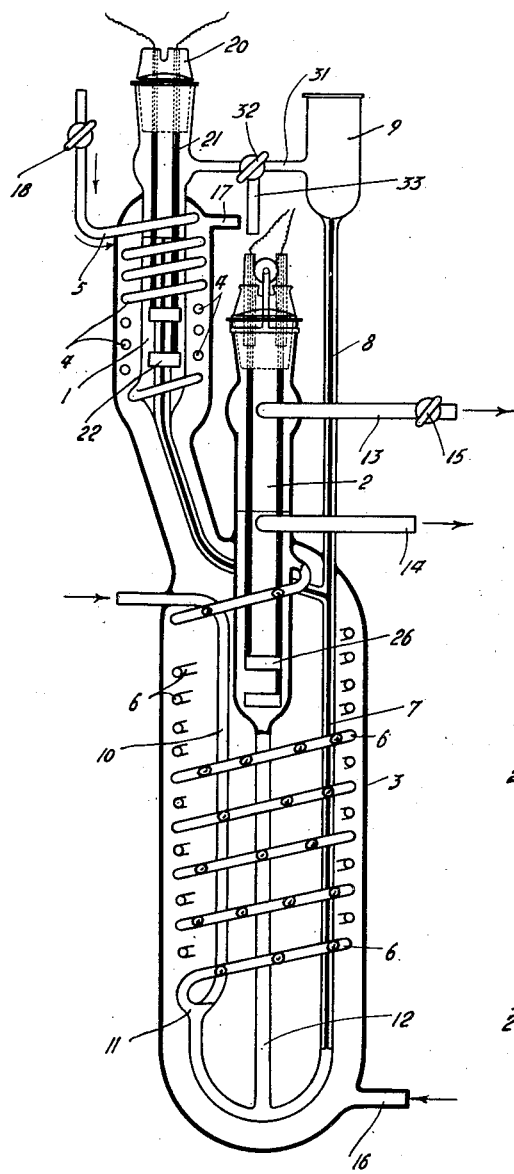

Feb. 13, 1951 R. EGALON ET AL 2,541,578
ELECTRICAL CONDUCTIVITY CELL FOR MEASURING FLOW
Filed Oct. 2, 1947 2 Sheets-Sheet 1

INVENTORS.
ROGER EGALON,
RENE VANHILLE
AND MAURICE WILLEMYNS.
Allen & Allen
ATTORNEYS.

Patented Feb. 13, 1951

2,541,578

UNITED STATES PATENT OFFICE 2,541,578

ELECTRICAL CONDUCTIVITY CELL FOR MEASURING FLOW

Roger Egalon, Marquette-les-Lille, René Vanhille, Mouvaux, and Maurice Willemyns, Bois-Grenier, France, assignors to Manufactures de Produits Chimiques du Nord Etablissements Kuhlmann, Paris, France, a corporation of France Application October 2, 1947, Serial No. 777,434
In France June 17, 1947

3 Claims. (Cl. 175—183)

Various means have been proposed to measure continuously the flow of a constituent of a gaseous mixture. A particularly suitable method consists in using a process based on electrical conductivity.

This method consists in causing the gaseous constituent to be absorbed by an electrolyte into which are immersed two platinized or platinum electrodes and to compare the conductivity of the electrolyte after the absorption of the gaseous component with that of the same electrolyte before the said absorption. Most usually, two electrolytic cells are employed, the gaseous mixture flowing only into one of them. In each of these cells are immersed two electrodes and these two pairs of electrodes are connected to a Wheatstone bridge equipped with a galvanometer, the variations of which are graphically recorded. The two cells are placed into a common liquid in order to avoid the influence of the atmospheric temperature on the accuracy of the measurement.

Obviously, in order to use such a method it is necessary to provide a constant flow of gaseous mixture and all the constituents which may be capable of altering the measurement must first be eliminated. This may be done, for instance, by chemical transformation of the component to be measured to render it, alone, soluble in the absorbent electrolyte selected.

Several kinds of cells have been proposed to carry out the said method. In some of them the electrolyte flowed in a closed circuit and saturated progressively; the retained constituent was totalized without notice being given of its instantaneous value. It needed practice to appreciate a prohibitive content by the sole aspect of the angular coefficient of the obtained curve. Accordingly, such cells did not permit of an automatic acoustic or other signalization of a prohibitive content. In some other cells which have been proposed, the electrolyte flows in an open circuit, but such cells are delicate and can not be easily conveyed from any part of a shop to another. Moreover, in such cells, the thermostatic liquid generally flows outside the cell in a bulky tank distinct from said cell.

The present invention relates to an electrolytic cell in which these drawbacks are avoided. The cell according to the invention consists of a reference-cell and a measuring-cell, both being integral parts of a thermostatic sleeve into which they are immersed and each comprising two platinized or platinum electrodes. The reference-cell is surrounded by a coiled tubing connected at one end to the lower part of said cell and at the other to an inlet pipe for the electrolyte. The measuring-cell is also surrounded by a coiled tubing connected at one end to the intermediate part of this latter cell and at the other end, to the lower part of the said cell, and also to the reference-cell through a capillary duct which penetrates up to mid-height of said reference-cell. This capillary duct is connected to a second vertical capillary duct in communication with the atmosphere. An inlet pipe for the gaseous mixture is connected to the end of the coil surrounding the measuring-cell adjoining the capillary duct connecting the cells to one another, two outlet pipes being provided in the measuring-cell, one for the gas, the other for the electrolyte. The whole apparatus is preferably made of glass of low thermal expansion.

The electrolyte flow is preferably regulated by a valve mounted up stream with respect to the coil surrounding the reference-cell. This valve advantageously comprises a removable throttle having several calibrated ports forming calibrated capillaries. The spacing of the two electrodes of the reference-cell is constant, but that of the two electrodes of the measuring-cell is advantageously adjustable.

The electrolysis cell according to the invention may be used in letting the electrolyte flow in a closed circuit but with thermal regeneration in this circuit.

This cell may also be used to measure with accuracy the vapour pressures of solutions.

Figure 2:
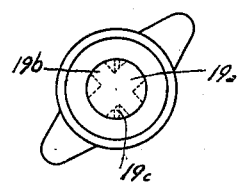
Figure 3:
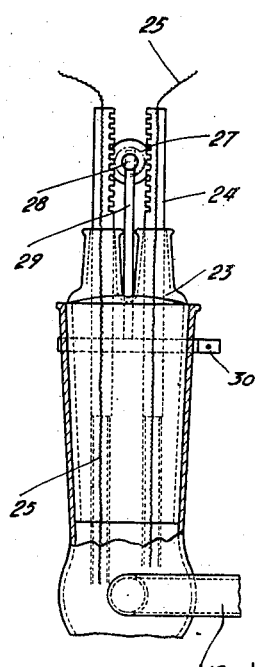
Figure 4:
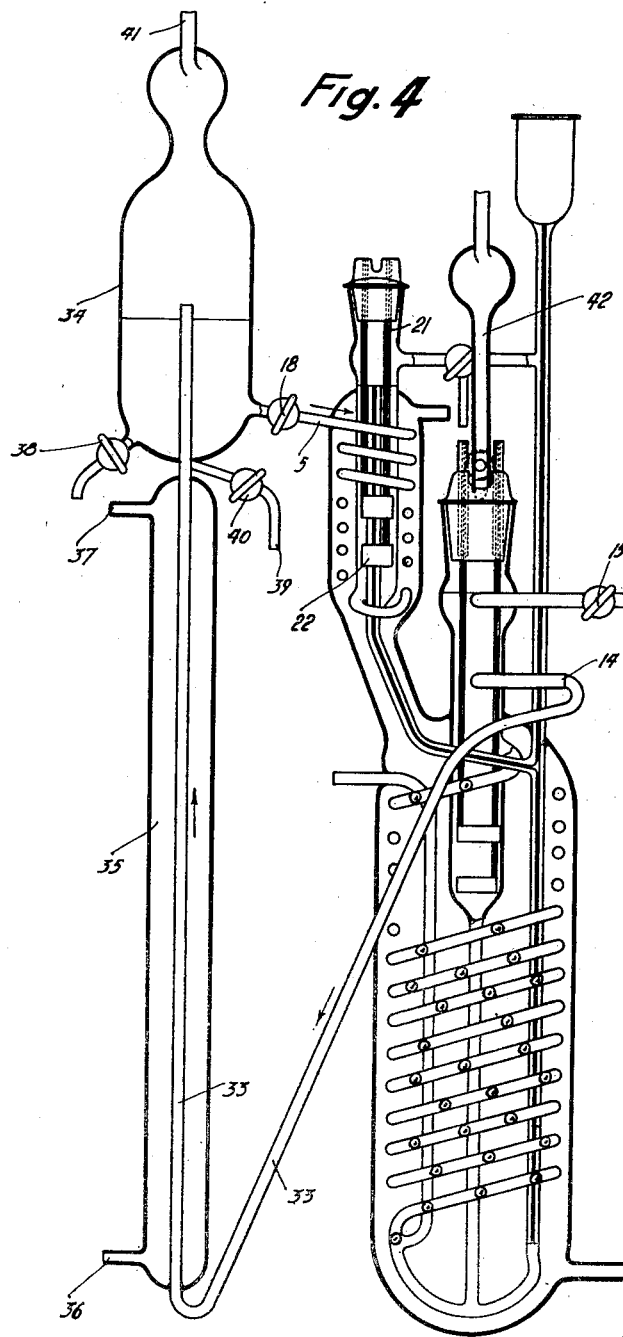

An embodiment of the cell according to the invention is described hereafter by way by example with reference to the accompanying drawings in which:

Figure 1 is an elevational view of the cell;
Figure 2 is a side view of the throttle of the valve regulating the inlet flow of the electrolyte;
Figure 3 shows the relative positions of the electrodes in the measurement-cell; and
Figure 4 represents a particular arrangement of the cell.

As shown in the drawings the cell consists of a reference-cell 1 and of a measuring-cell 2 enclosed in and sealed to a thermostatic sleeve 3. The reference-cell is surrounded by a coil 4 connected at one end to the lower part of cell 1 and at the other end to an inlet pipe 5 for the electrolyte. The measuring-cell 2 is also surrounded by a coiled tubing 6 connected at one end to cell 2 and at the other end to cell 1 through a capillary tube 7 which penetrates up to mid-height of cell 1. From the capillary tube 7 there extends another vertical capillary duct 8 in communication with the atmosphere and which terminates in a funnel opening 9. A graduated scale may be provided on this tube to measure the amount of electrolyte flowing in the capillary tube 7. An inlet tube 10 for the gaseous mixture is connected at 11 to the end of the coiled tubing 6 adjacent the capillary tube 7. A pipe 12 connects this latter end of the coiled tubing 6 to the lower part of cell 2. Two outlet pipes are provided in the measuring-cell, a pipe 13 for the gas, a pipe 14 for the electrolyte. A stop valve 15 is fitted to pipe 13.

The thermostatic liquid enters at 16 into the sleeve 3 and departs from same at 17.

The electrolyte entering at 5 flows into the coiled tubing 4 and thus assumes the same temperature of the thermostatic device. It then enters into the lower part of cell 1, and fills the same up to the opening of the capillary duct 7, through which it flows, at constant level, into the flowmeter 8. At 11, it meets the gas escaping from pipe 10 and the flow of which is regulated in such a way that it bubbles into the coiled tubing 6. A regular chain of bubbles is thus formed in this coiled tubing as far as cell 2 in which the gas separates from the electrolyte. The used electrolyte escapes through pipe 14 and the residual gas through pipe 13. The electrolyte flow is regulated by a valve 18 inserted in the piping 5. This valve has a removable throttle comprising a plurality of ports 19a, 19b, 19c. The upper end of cell 1 is provided with a stopper 20 through which pass two conducting wires 21 extending to two platinized or platinum electrodes 22. The diameter of these electrodes is about 1 cm. and their height is 0.5 cm. The distance separating them in constant.

The upper end of cell 2 is also provided with a stopper 23 through which pass two rack-shaped tubes 24 inside which are arranged two conducting wires 25 extending respectively the two platinized or platinum electrodes 26. The racks of tube 24 engage with a pinion 27 the shaft 28 of which is fastened to two rods 29, fastened in their turn to a collar 30 encompassing cell 2. A knob, not shown in the drawing, is fastened to shaft 28 permitting adjustment of the spacing of the electrodes 26 and thus adjustment of the zero of the scale. The wires 20 and 25 are connected to a Wheatstone bridge of known type, not shown. Finally, the cell 1 is connected to the funnel opening 9 by a tube 31 into which is fitted a three way cock 32 permitting drainage of the apparatus through tube 33.

Figure 4 represents a particular embodiment in which the electrolyte flows in a closed circuit, by thermosyphon effect, with regeneration of the used electrolyte in this circuit.

The outlet pipe 14 for the electrolyte is connected through a pipe 33 to a vessel 34 into which said pipe 33 extends up to mid-height above the electrolyte level. The pipe 33 passes through a sleeve 35 into which flows a heating or refrigerating liquid, entering at 36 and escaping at 37. The lower part of the vessel 34 is connected to the pipe 5 and it is provided with a drain cock 38. Provision is also made for a pipe 39 fitted with a stop valve 40 to admit, if desired, an inactive gas to increase the thermosyphonic motion and the expulsion of the desorbed gases which are expelled at 41.

The stop valve 15 is closed and the stopper 23 is replaced by a special stopper through which passes, between the two pipes 24, a pipe 42 through which the residual gase escapes.

This arrangement is used, for instance, in the case of absorbing electrolytes the vapour pressure of which is small at their thermal regeneration temperature. Thus it should be used to dose $SO_2$ or $SH_2$ in a gaseous mixture, using for electrolyte monoethanolamine the vapour pressure of which is negligible at 100° C. Steam should then be admitted into the sleeve 35. If, on the other hand, the solvent is volatile at a high temperature, as is the case for distilled water, a refrigerating medium is circulated into the sleeve 35 the desorbed gases being carried along by a flow of inactive gas entering at 39.

What we claim is:

1. An electrolytic cell for continuously measuring the flow of a constituent of a gaseous mixture, comprising a thermostatic sleeve, a reference cell and a measuring cell forming integral parts of said sleeve, and contained therein and each provided with two platinized electrodes, an inlet pipe for an electrolyte, a first coiled tubing surrounding the reference cell and connected at one end to the lower part of said reference cell and at the other end to said inlet pipe, the second coiled tubing surrounding the measuring cell connected at one end to the intermediate part of said measuring cell, and at the other end to the lower part of said measuring cell, a first capillary tube in communication with the atmosphere, a second capillary tube entering said reference cell and penetrating up to the mid-height thereof, said capillary tubes being connected to the end of the second mentioned coiled tubing adjoining the lower part of the measuring cell, an inlet tube for the gaseous mixture connected to that end of the coil surrounding the measuring cell adjoining the capillary tubes, and two outlet pipes in the measuring cell, one for the gas and the other for the electrolyte.

2. An electrolytic cell according to claim 1 in which the measuring cell is provided with a stopper, said stopper slidably carrying two rack-shaped tubes each containing a conducting wire, and carrying one of said electrodes, a pinion engaging the racks of said tubes, said pinion being rotatable to adjust the spacing of said electrodes.

3. An electrolytic cell according to claim 1 in which a vessel is provided and in which a tube passing through a sleeve having inlet and outlet pipes for liquid connects the outlet pipe of the electrolyte with said vessel, said pipe extending up approximately to mid-height of said vessel and the latter being connected at its lower part to the inlet pipe of the electrolyte to said reference cell, said vessel being provided with a pipe for the admittance of gas.

ROGER EGALON.
RENÉ VANHILLE.
MAURICE WILLEMYNS.

REFERENCES CITED

The following references are of record in the file of this patent:

UNITED STATES PATENTS

| Number | Name | Date |
|---|---|---|
| 933,015 | Bishop | Aug. 31, 1909 |
| 1,734,342 | Perry | Nov. 5, 1929 |
| 2,146,312 | Powell et al. | Feb. 7, 1939 |
| 2,329,459 | Dickey | Sept. 14, 1943 |
| 2,344,859 | Fox | Mar. 21, 1944 |
| 2,413,261 | Stackhouse | Dec. 24, 1946 |
| 2,462,293 | Thomas | Feb. 22, 1949 |

OTHER REFERENCES

Perry, "Chemical Engineers Handbook," 2nd edition, page 868, "Mixture Metering." Publ. by McGraw-Hill Book Co., New York, 1941.